United States Patent
Smidth et al.

(10) Patent No.: US 8,040,870 B1
(45) Date of Patent: Oct. 18, 2011

(54) AUTOMATIC TIMING SYNCHRONIZATION FOR WIRELESS RADIO NETWORKS

(75) Inventors: Peter Smidth, San Luis Obispo, CA (US); Yongmin Zhang, San Jose, CA (US); Jean-Laurent Plateau, San Jose, CA (US)

(73) Assignee: Exalt Communications, Inc., Campbell, CA (US)

( * ) Notice: Subject to any disclaimer, the term of this patent is extended or adjusted under 35 U.S.C. 154(b) by 703 days.

(21) Appl. No.: 12/138,239

(22) Filed: Jun. 12, 2008

Related U.S. Application Data (60) Provisional application No. 61/017,128, filed on Dec. 27, 2007.

(51) Int. Cl.
*H04J 3/06* (2006.01)

(52) U.S. Cl. .................... 370/350; 370/503

(58) Field of Classification Search .......... 370/350, 370/349, 473, 503, 510–514
See application file for complete search history.

(56) References Cited

U.S. PATENT DOCUMENTS

| | | | |
|---|---|---|---|
| 6,185,429 B1* | 2/2001 | Gehrke et al. | 455/502 |
| 2009/0016320 A1* | 1/2009 | Li et al. | 370/350 |
| 2009/0122782 A1* | 5/2009 | Horn et al. | 370/350 |

* cited by examiner

*Primary Examiner* — Brenda H Pham
(74) *Attorney, Agent, or Firm* — Hickman Palermo Truong & Becker LLP

(57) ABSTRACT

Radios synchronize their timing mechanisms using a timing signal that those radios propagate from one radio to another. Radios that are close to each other transmit only during times that none of the other nearby radios is trying to receive. In one scheme, a "master" radio initiates communication while another "slave" radio responds in a pre-determined manner. The master generates and propagates an inverted timing signal to the slave, which propagates approximately the same inverted timing signal to other radios in the slave's cluster. Each radio can be in one of three different modes: "source," "auto," and "recipient" modes. A "source" radio generates a timing signal independently. A "recipient" radio uses a received timing signal and forwards it to other radios. An "auto" radio behaves as a "recipient" radio while a timing signal is detectable, but behaves as a "source" radio if the timing signal is lost.

16 Claims, 4 Drawing Sheets

AUTOMATIC TIMING SYNCHRONIZATION FOR WIRELESS RADIO NETWORKS

CLAIM OF PRIORITY

The present application claims domestic priority under 35 U.S.C. §119 to U.S. Provisional Patent Application Ser. No. 61/017,128, titled "METHOD FOR AUTOMATIC TIMING SYNCHRONIZATION FOR WIRELESS RADIO NETWORKS," filed on Dec. 27, 2007.

FIELD OF THE INVENTION

The present invention relates to time division duplex (TDD) radio communication, and, more specifically, to techniques for automatically synchronizing the transmission timing between radios based on timing signal propagation from one radio to another.

BACKGROUND

When two or more TDD-using radios (such as microwave radios) are located in close proximity to each other, and when those radios are configured to communicate over the same or close frequency bands, communications will be of a better quality if none of those radios transmits during any interval of time that any of the other radios are receiving. If two or more TDD-using radios are located in close proximity to each other, and if any one of those radios transmits during any part of a time interval during which another one of those radios is trying to receive, then the transmitting radio's transmission may interfere with the receiving radio's reception. For this reason, when two or more TDD-using radios are located in close proximity to each other, communications will be of a better quality if all of those radios limit their transmissions to time intervals during which none of those radios is trying to receive.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. U.S. Provisional Patent Application Ser. No. 61/017,128, to which the present application claims priority, is incorporated by reference herein.

Overview

According to techniques described herein, multiple TDD-using radios that are located in close proximity to each other synchronize their timing mechanisms (e.g., clocks) with each other so that each of those radios transmits only during time intervals during which none of the other nearby radios is trying to receive. According to one technique, after the TDD-using radios have synchronized their timing mechanisms, each of those radios transmits during approximately the same transmitting time interval in which all of the other nearby radios are transmitting, and each of those radios listens, or receives, during approximately the same receiving time interval in which all of the other nearby radios are receiving. Transmitting time intervals are alternated with receiving time intervals, with one following the other. Thus, radios that are located closely to each other only transmit when the other nearby radios are not receiving, and only receive when the other nearby radios are not transmitting.

According to one technique, radios that are located in close proximity to each other synchronize their timing mechanisms, as discussed above, using a timing signal (also called a "sync signal") that those radios propagate from one radio to another. For example, in one embodiment of the invention, an upstream radio generates a timing signal that is based on the current setting of the upstream radio's timing reference—the mechanism that the upstream radio uses to determine when transmission and receiving time intervals begin and end. The upstream radio sends the timing signal (e.g., over a wire of some kind) to a downstream radio that is located in close proximity to the upstream radio. The downstream radio receives the timing signal from the upstream radio and sets the downstream radio's timing reference based on the information contained in the timing signal. As a consequence of setting the downstream radio's timing reference in this manner, the downstream radio's timing reference becomes synchronized, at least approximately, with the upstream radio's timing reference. Since both the upstream and downstream radios determine when transmission and receiving time intervals begin and end based on their respective timing references, the synchronization of those radios' timing references ensures that neither radio will transmit during any part of a time interval during which the other is trying to receive. If there is yet another further-downstream radio that is nearby to the downstream radio, then the downstream radio may propagate the same, or a similar, timing signal to that other radio, so that that other radio can synchronize its timing reference with the downstream radio's timing mechanism. The timing signal may be propagated from radio to radio in this manner so that all of the radios that are located in close proximity to each other will have their timing references synchronized.

Although the radio that initially generates the timing signal may do so based upon an external signal that comes from some other external signal source, such as a global positioning system (GPS) signal that is transmitted from an Earth-orbiting satellite, this is not necessary. As an advantage of one embodiment of the invention, none of the radios needs to be connected with, or have built into it, GPS signal-receiving equipment. The radios propagate the timing signal from one radio to another. Therefore, in one embodiment of the invention, none of the radios needs to receive a GPS signal from a satellite in order to synchronize that radio's timing reference (although, in one embodiment of the invention, the radio that initially generates the timing signal may synchronize that radio's own timing reference based on a GPS signal). Because GPS equipment is not needed in such an embodiment of the invention, the expense of establishing a multi-radio communication network can be reduced considerably—especially where large numbers of radios will be used. Additionally, because no radio needs to receive a GPS signal in such an embodiment of the invention, the radios can synchronize their timing references with each other even while environmental conditions which would interfere with GPS signal reception (e.g., obstructed view of satellites) are present.

Other features that may be included in various other embodiments of the invention are discussed in more detail below.

Example Radio Communication Network

Figure 1:
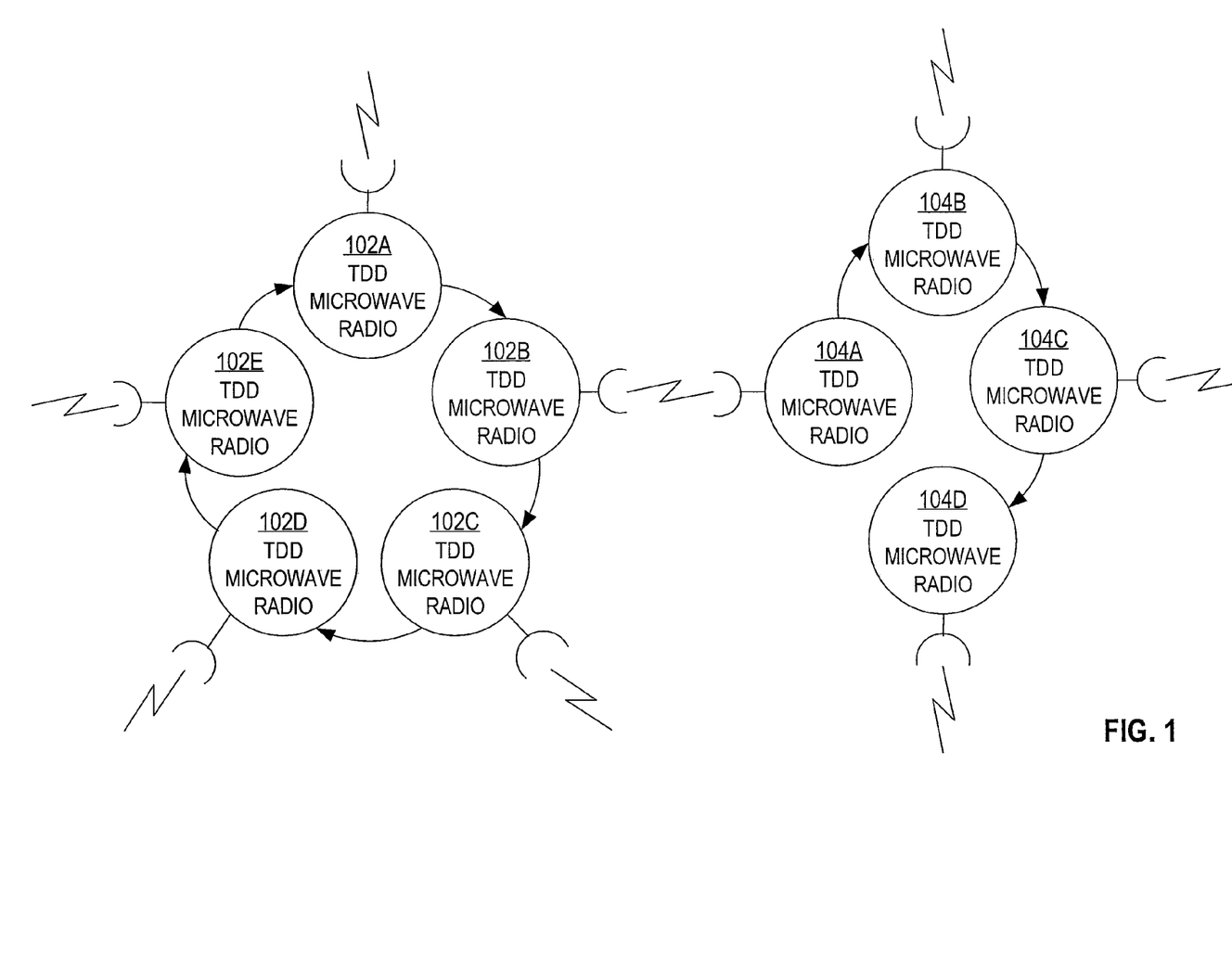
FIG. 1 is a block diagram that illustrates an example of a radio communication network in which embodiments of the invention may be implemented and practiced.

FIG. 1 is a block diagram that illustrates an example of a radio communication network in which embodiments of the invention may be implemented and practiced. The network of FIG. 1 comprises TDD microwave radios 102A-E and TDD microwave radios 104A-D. In one embodiment of the invention, TDD microwave radios 102A-E and 104A-D all transmit and receive over the same or relatively nearby radio frequency bands. Alternative embodiments of the invention may include more, fewer, or different components that those illustrated in FIG. 1.

In the network of FIG. 1, TDD microwave radios 102A-E are located relatively close to each other, such that if any of TDD microwave radios 102A-E transmitted over the air at the same time that another of TDD microwave radios 102A-E was attempting to receive over the air, then that transmission would interfere to at least some extent with the reception of the radio that was trying to receive. TDD microwave radios 102A-E are in the same "cluster" of radios. Therefore, in one embodiment of the invention, TDD microwave radios 102A-E each synchronize with each other, by propagating a timing signal between each other, in order to ensure that each of TDD microwave radios 102A-E only transmits during time intervals that none of TDD microwave radios 102A-E is trying to receive. Thus, in one embodiment of the invention, each of TDD microwave radios 102A-E transmits during a transmission time interval. Following the transmission time interval, each of TDD microwave radios 102A-E ceases transmission and receives incoming transmissions from other radios during a receiving time interval. Successive pairs of transmission and receiving time intervals follow.

In one embodiment of the invention, TDD microwave radios 102A-E propagate the timing signal among themselves via cable. In the illustrated configuration, TDD microwave radio 102A is connected via cable directly to TDD microwave radio 102B. TDD microwave radio 102B is connected, in turn, directly via cable to TDD microwave radio 102C. In similar manner, TDD microwave radio 102C is connected directly to TDD microwave radio 102D via cable. TDD microwave radio 102D is likewise directly connected to TDD microwave radio 102E via cable. TDD microwave radio 102E is directly connected to TDD microwave radio 102A via cable. Any sort of signal-carrying medium may function to connect TDD microwave radios 102A-E with each other.

Significantly, in one embodiment of the invention, each of the connections between TDD microwave radios 102A-E is a direct connection between only two of those radios. Such an embodiment of the invention provides the benefit that if any single connection becomes severed or interrupted for some reason, the other connections between the radios will remain unaffected by the severance. Such an embodiment of the invention differs from a hypothetical configuration in which radios might all be connected together by a single bus. When a single bus is severed at some point, then communications with multiple bus-connected entities may be interrupted; this potential weakness is avoided by the illustrated embodiment of the invention in which each cable connects no more than two radios together. Although the embodiment of the invention shown in FIG. 1 has each cable connecting exactly two of radios 102A-E together, other alternative embodiments of the invention may differ in the manner in which radios 102A-E are connected and in the manner that radios 102A-E propagate a timing signal between each other.

In one embodiment of the invention, TDD microwave radios 102A-E transmit and receive in different directions over the air. Thus, each of TDD microwave radios 102A-E may transmit to and receive from radios in different "clusters" of TDD microwave radios. For example, in the embodiment of the invention illustrated in FIG. 1, TDD microwave radio 102B sends over-the-air (i.e., "wireless") transmissions during the transmission interval to TDD microwave radio 104A, which is part of a different "cluster." TDD microwave radios 104A-D are located remotely from TDD microwave radios 102A-E. Thus, TDD microwave radios 104A-D are located in the same "cluster" as each other, but in a different "cluster" from TDD microwave radios 102A-E.

In one sense, a pair TDD microwave radios have to take turns to transmit signals to avoid collision. A typical scheme is that one radio, defined as the "master," initiates communication while the other radio, defined as "slave," responds in a pre-determined manner. For example, in FIG. 1, radio 104A is a "slave" relative to TDD microwave radio 102B, and TDD microwave radio 102B is a "master" relative to TDD microwave radio 104A. In one embodiment of the invention, based on its own transmission-receiving pattern, TDD microwave radio 104A generates and propagates an inverted (relative to the timing signal propagated among radios in group 102) timing signal to TDD microwave radio 104B, which propagates approximately the same inverted timing signal to TDD microwave radio 104C, which propagates approximately the same inverted timing signal to TDD microwave 104D. TDD microwave radio 104A is a timing signal source relative to TDD microwave radios 104B-D, although TDD microwave radio 104A generates its inverted timing signal based to at least some extent on the timing of the over-the-air transmissions from TDD microwave radio 102B.

In one embodiment (but not necessarily all embodiments) of the invention, TDD microwave radio 102B propagates an inverted timing signal over-the-air to TDD microwave radio 104A. TDD microwave radio 104A receives the inverted timing signal over the air and synchronizes its internal timing reference in an inverted manner relative to the internal timing reference of TDD microwave radio 102B.

Thus, in one embodiment of the invention, TDD microwave radios 102A-E are Co-synced™ relative to each other, and TDD microwave radios 104A-D are Co-synced™ relative to each other, but TDD microwave radios 104A-D are Counter-synced™ relative to TDD microwave radios 102A-E (and vice-versa). Viewed in one way, there is a hierarchy of timing influence among the radios shown in FIG. 1: TDD microwave radio 102A, at the top of the hierarchy, influences the transmission timing of TDD microwave radio 102B, which influences the transmission timings of both TDD microwave radios 102C (over cable and directly) and 104A (over the air and inversely). TDD microwave radio 102C influences the transmission timing of TDD microwave radio 102D, which influences the transmission timing of TDD microwave radio 102E. TDD microwave radio 104A influences the transmission timing of TDD microwave radio 104B, which influences the transmission timing of TDD microwave radio 104C, which influences the transmission timing of TDD microwave radio 104D.

Thus, in one embodiment of the invention, a timing signal generated (or received from an external source) by any one of TDD microwave radios 102A-E can be used to ensure that little or no interference will occur between any of the TDD microwave radios shown in the radio communication network of FIG. 1.

Example Timing Signal Propagation Technique

Figure 2:
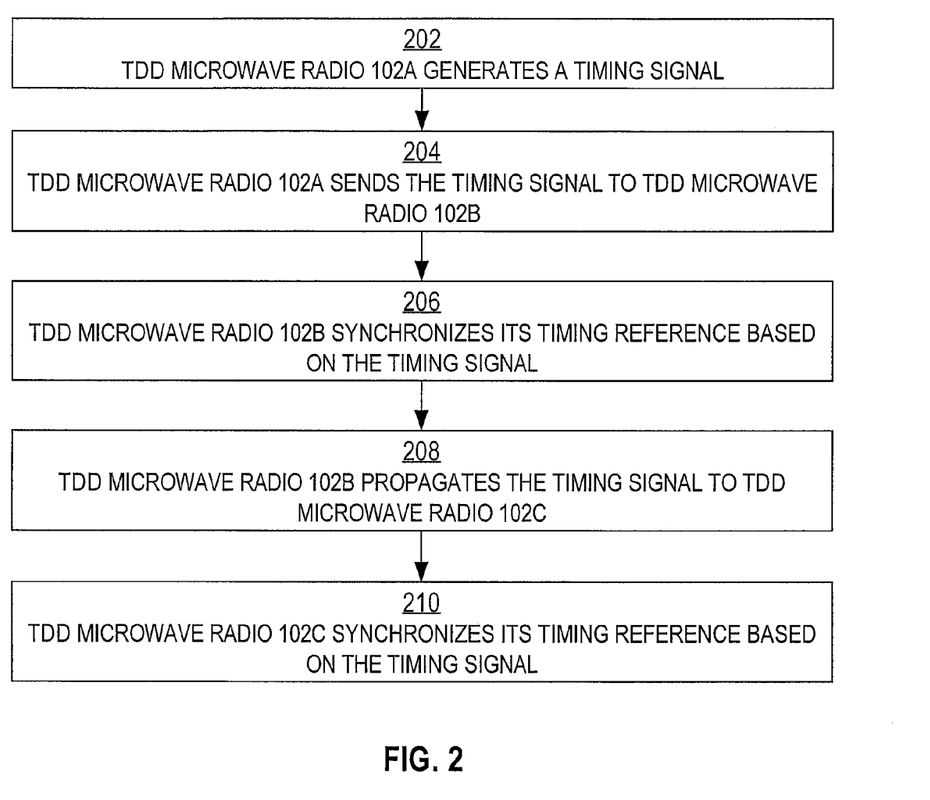
FIG. 2 is a flow diagram that illustrates an example of a technique for propagating a timing signal between closely proximate, physically connected TDD microwave radios, according to one embodiment of the invention.

FIG. 2 is a flow diagram that illustrates an example of a technique for propagating a timing signal between closely proximate, physically connected TDD microwave radios, according to one embodiment of the invention. Although certain steps are shown in the flow diagram of FIG. 2, alternative embodiments of the invention may incorporate more, fewer, or different steps than those shown.

In step 202, TDD microwave radio 102A generates a timing signal. For example, TDD microwave radio 102A may generate a timing signal that indicates a series of timing interval changes. Each such change may represent a transition from a transmission time interval to a receiving time interval, or vice-versa. In the timing signal, a change from a transmission time interval to a receiving interval is followed, after some amount of time, by a change from the receiving time interval to another transmission time interval, and vice-versa. In one embodiment of the example, TDD microwave radio 102A generates the timing signal exclusively using a timing reference or mechanism that is internal to TDD microwave radio 102A. In an alternative embodiment of the invention, TDD microwave radio 102A generates the timing signal based at least in part on a signal that TDD microwave radio 102A receives from an external source; for example, TDD microwave radio 102A may receive a GPS signal from external GPS signal-receiving equipment that is connected to TDD microwave radio 102A. Such a GPS signal may originate from an orbiting GPS satellite. Regardless of the manner in which the timing signal is generated, TDD microwave radio 102A uses the timing signal to determine the time intervals during which TDD microwave radio 102A will exclusively transmit, and the time intervals during which TDD microwave radio 102A will exclusively receive. In one embodiment, TDD microwave radio 102A generates the timing signal continuously, without interruption.

In step 204, TDD microwave radio 102A sends the timing signal over a cable to TDD microwave radio 102B. TDD microwave radio 102B receives the timing signal from TDD microwave radio 102A over the cable that connects the two radios directly together. In one embodiment of the invention, TDD microwave radio 102A sends the timing signal continuously to TDD microwave radio 102B.

In step 206, TDD microwave radio 102B synchronizes, based on the timing signal that TDD microwave radio 102B receives from TDD microwave radio 102A, a timing reference that is internal to TDD microwave radio 102B. The timing reference is the mechanism that TDD microwave radio 102B consults and uses in order to determine whether the current timing interval is a transmission timing interval or a receiving timing interval; thus, TDD microwave radio 102B uses the synchronized timing reference to determine the time intervals during which TDD microwave radio 102B should exclusively transmit, and the time intervals during which TDD microwave radio 102B should exclusively receive. As a result of TDD microwave radio 102B setting, or synchronizing, the timing reference of TDD microwave radio 102B based on the timing signal received from TDD microwave 102A, TDD microwave radio 102B will transmit, and not receive, over the air during the same transmission timing interval that TDD microwave radio 102A transmits and does not receive over the air. Likewise, as a result of this timing signal-based synchronization, TDD microwave radio 102B will receive, and not transmit, over the air during the same receiving timing interval that TDD microwave radio 102A receives and does not transmit over the air.

In step 208, TDD microwave radio 102B sends, or propagates, the same or a similar timing signal to TDD microwave radio 102C, with which TDD microwave radio 102B is directly connected via cable. TDD microwave radio 102B sends the timing signal over this cable. In one embodiment of the invention, TDD microwave radio 102B merely forwards on, to TDD microwave radio 102C, the exact same timing signal that TDD microwave radio 102B received from TDD microwave radio 102A. In an alternative embodiment of the invention, TDD microwave radio 102B modifies the received timing signal before sending that timing signal on to TDD microwave radio 102C (e.g., to contain additional information), and/or TDD microwave radio 102B generates a similar timing signal based on the now-synchronized timing reference that is internal to TDD microwave radio 102B. Regardless of the precise manner in which TDD microwave radio 102B sends the timing signal to TDD microwave radio 102C, the timing signal carries information that is designed to cause TDD microwave radio 102C to become synchronized, in transmission and receiving time intervals, with TDD microwave radios 102A and 102B. In one embodiment of the invention, TDD microwave radio 102B continuously sends the timing signal to TDD microwave radio 102C. TDD microwave radio 102C receives the timing signal from TDD microwave radio 102B over the cable that connects the two radios directly together.

In step 210, TDD microwave radio 102C synchronizes, based on the timing signal that TDD microwave radio 102C receives from TDD microwave radio 102B, a timing reference that is internal to TDD microwave radio 102C. The timing reference is the mechanism that TDD microwave radio 102C consults and uses in order to determine whether the current timing interval is a transmission timing interval or a receiving timing interval; thus, TDD microwave radio 102C uses the synchronized timing reference to determine the time intervals during which TDD microwave radio 102C should exclusively transmit, and the time intervals during which TDD microwave radio 102C should exclusively receive. As a result of TDD microwave radio 102C setting, or synchronizing, the timing reference of TDD microwave radio 102C based on the timing signal received from TDD microwave 102B, TDD microwave radio 102C will transmit, and not receive, over the air during the same transmission timing intervals that TDD microwave radios 102A-B transmit and do not receive over the air. Likewise, as a result of this timing signal-based synchronization, TDD microwave radio 102C will receive, and not transmit, over the air during the same receiving timing intervals that TDD microwave radios 102A-B receive and do not transmit over the air.

In one embodiment of the invention, the propagation of the timing signal and the synchronization based thereon continues from TDD microwave radio 102C to TDD microwave radio 102D, and from TDD microwave radio 102D to TDD microwave radio 102E. A greater or lesser number of radios may be involved in alternative embodiments of the invention. In one embodiment of the invention, TDD microwave radio 102E is connected directly via cable back to TDD microwave radio 102A, thereby forming a "loop" configuration. Under some circumstances, where TDD microwave radio 102A is designated as being in "source" mode, TDD microwave radio 102A merely ignores the timing signal received from TDD microwave radio 102E, since it is the same timing signal that TDD microwave radio 102A generates in the first place. "Source" mode and other modes, which are present in certain embodiments of the invention, are discussed in greater detail below.

Modes of Operation

In one embodiment of the invention, each of TDD microwave radios 102A-E is, at any given time, designated and configured as being in one of three different modes: "source," "auto," and "recipient" modes. Different ones of TDD microwave radios 102A-E may be in different modes at the same time. The manner in which a particular one of TDD microwave radios 102A-E becomes set to a particular mode may vary between embodiments of the invention. Each of these modes is discussed in further detail below.

Source Mode

When a TDD microwave radio is set to "source" mode, that TDD microwave radio generates a timing signal that other TDD microwave radios will receive, use to synchronize their timing references, and propagate on to yet other TDD microwave radios. For example, TDD microwave radio 102A might be initially configured to operate in "source" mode; as such, TDD microwave radio 102A generates the timing signal that TDD microwave radios 102B-E use to synchronize their timing references—the timing references that those radios use to determine when transmission and receiving timing intervals begin and end. In one embodiment of the invention, a TDD microwave radio that is set to "source" mode can, potentially, receive a timing signal also; this may occur, for example, when multiple TDD microwave radios are configured in a "loop," such as is shown in FIG. 1 (TDD microwave radio 102E propagates the timing signal back to TDD microwave radio 102A). In such an embodiment of the invention, a TDD microwave radio that is set to "source" mode ignores any timing signal that the TDD microwave radio receives from another TDD microwave radio. However, even though a "source" TDD microwave radio ignores incoming timing signals in one embodiment of the invention, an advantage of the "loop" configuration under certain circumstances (namely, when the "source" TDD microwave radio fails) will become apparent from further discussion below.

Recipient Mode

When a particular TDD microwave radio is set to "recipient" mode, that particular TDD microwave radio normally receives an incoming timing signal from another TDD microwave radio, and uses that timing signal to synchronize that particular TDD microwave radio's internal timing reference. A TDD microwave radio set to "recipient" mode usually functions in this manner until the TDD microwave radio fails to detect an incoming timing signal on its "synchronization in" port. However, in one embodiment of the invention, as soon as a "recipient" TDD microwave radio fails to detect an incoming timing signal, the "recipient" TDD microwave radio will begin "flywheeling" and start a timer that will expire when a certain threshold amount of time has passed since the incoming timing signal was lost. While the timer is running, the "recipient" TDD microwave radio attempts to re-detect the incoming timing signal. For as long as the "recipient" TDD microwave radio cannot re-detect the incoming timing signal, the "recipient" TDD microwave radio continues to operate, by flywheeling, based on that radio's own timing reference, under the assumption that the timing reference, having been synchronized relatively recently before the loss of the timing signal, will still allow the radio to transmit and receive during the appropriate transmission and receiving timing intervals, so as not to interfere with the reception of other nearby TDD microwave radios. In one embodiment of the invention, the "recipient" TDD microwave radio does not propagate any timing signal on to any other radios while the timer is running.

While the timer is running, if the "recipient" TDD microwave radio re-detects the incoming timing signal, then the "recipient" TDD microwave radio stops flywheeling and synchronizes its internal timing reference based on the incoming timing signal, and resumes operating in the same manner in which it was operating prior to the loss of the incoming timing signal. Alternatively, in one embodiment of the invention, if the timer expires before the "recipient" TDD microwave radio re-detects an incoming timing signal, then the "recipient" TDD microwave radio ceases transmitting entirely (the TDD microwave radio may still attempt to receive during receiving timing intervals), due to the concern that the "recipient" TDD microwave radio's internal timing reference might have drifted too far to allow that radio to continue to operate in synchrony with other nearby radios. To avoid potentially interfering with the reception of other nearby radios, the "recipient" radio stops transmitting. In one embodiment of the invention, while a "recipient" TDD microwave radio has entered a "no transmission" state in this manner, the "recipient" radio still attempts to re-detect an incoming timing signal, and, upon re-detecting an incoming timing signal, the "recipient" radio exists the "no transmission" state, synchronizes its internal timing reference based on the incoming timing signal, and propagates the incoming timing signal to other radios in the same manner that the "recipient" radio did prior to detecting the previous loss of the incoming timing signal.

Auto Mode

In one embodiment of the invention, a radio operating in "auto" mode behaves similarly to a radio operating in "recipient" radio, except that, instead of entering the "no transmission" state after detecting no incoming timing signal for a specified duration of time, an "auto" radio acts as a "source" radio until the incoming timing signal is re-detected. In embodiments of the invention in which three or more radios are configured in a "loop" configuration, such as the configuration of TDD microwave radios 102A-E in FIG. 1, one TDD microwave radio might be configured to operate in "source" mode, another TDD microwave radio might be configured to operate in "auto" mode, and the remaining TDD microwave radios in the loop might be configured to operate in "recipient" mode.

More specifically, when a particular TDD microwave radio is set to "auto" mode, that particular TDD microwave radio normally receives an incoming timing signal from another TDD microwave radio, and uses that timing signal to synchronize that particular TDD microwave radio's internal timing reference. A TDD microwave radio set to "auto" mode usually functions in this manner until the TDD microwave radio fails to detect an incoming timing signal on its "synchronization in" port; in one embodiment of the invention, an incoming timing signal is expected to be continuous. However, in one embodiment of the invention, as soon as an "auto" TDD microwave radio fails to detect an incoming timing signal, the "auto" TDD microwave radio starts a timer that will expire when a certain threshold amount of time has passed since the incoming timing signal was lost. While the timer is running, the "auto" TDD microwave radio attempts to re-detect the incoming timing signal. For as long as the "auto" TDD microwave radio cannot re-detect the incoming timing signal, the "auto" TDD microwave radio continues to operate based on that radio's own timing reference, under the assumption that the timing reference, having been synchronized relatively recently before the loss of the timing signal, will still allow the radio to transmit and receive during the appropriate transmission and receiving timing intervals, so as not to interfere with the reception of other nearby TDD microwave radios. As is discussed above with reference to the "recipient" mode, operation in this manner is also called "flywheeling." In one embodiment of the invention, the "auto" TDD microwave radio does not propagate any timing signal on to any other radios while the timer is running.

While the timer is running, if the "auto" TDD microwave radio re-detects the incoming timing signal, then the "auto" TDD microwave radio stops flywheeling and synchronizes its internal timing reference based on the incoming timing signal, and resumes operating in the same manner in which it was operating prior to the loss of the incoming timing signal. Alternatively, in one embodiment of the invention, if the timer expires before the "auto" TDD microwave radio re-detects an incoming timing signal, then the "auto" TDD microwave radio begins to act as though that radio were set to operate in "source" mode instead (although the "auto" TDD microwave radio actually remains in "auto" mode). Under such circumstances, the "auto" TDD microwave radio generates an original timing signal (not based on any currently incoming timing signal from another radio) and propagates that timing signal on to other radios. In one embodiment of the invention, while an "auto" TDD microwave radio is acting in this "source" manner, the "auto" radio still attempts to re-detect an incoming timing signal, and, upon re-detecting an incoming timing signal, the "auto" radio ceases acting as a "source" radio, synchronizes its internal timing reference based on the incoming timing signal, and propagates the incoming timing signal to other radios in the same manner that the "auto" radio did prior to detecting the previous loss of the incoming timing signal.

The "auto" mode is useful for protecting against the loss of timing signal propagation. Often, the TDD microwave radio that is directly "downstream" of the "source" TDD microwave radio will be set to operate in "auto" mode. For example, if TDD microwave radio 102A is set to "source" mode, then TDD microwave radio 102B may be set to "auto" mode. As a result, if TDD microwave radio 102A fails, or if the connection between TDD microwave radios 102A and 102B is severed, then TDD microwave radio 102B can function in the place of TDD microwave radio 102A for the sake of TDD microwave radios 102C-E. Under such circumstances, TDD microwave radio 102B generates a timing signal that is then propagated through TDD microwave radios 102C-E. Thus, the system continues to function in synchronous manner until the lack of connectivity between TDD microwave radios 102A and 102B is repaired.

In one embodiment of the invention, each TDD microwave radio is initially configured, by default, to operate in "auto" mode. When two or more TDD microwave radios in a non-loop chain are set to operate in "auto" mode, a particular one of those radios will operate as though it were the "source," and the others will synchronize based on the acting source's timing signal. The other "auto" TDD microwave radios will refrain from generating their own independent timing signals due to their receipt of an existing timing signal on their "synchronization in" ports. Thus, when multiple TDD microwave radios are configured in a non-loop chain, setting all of the radios initially to "auto" mode requires the least manual configuration by a human operator. However, when TDD microwave radios are configured in a loop, such as the loop in which TDD microwave radios 102A-E are configured in FIG. 1, setting more than one radio in the loop to "auto" mode is not recommended.

Example Timing Signal

Figure 3:
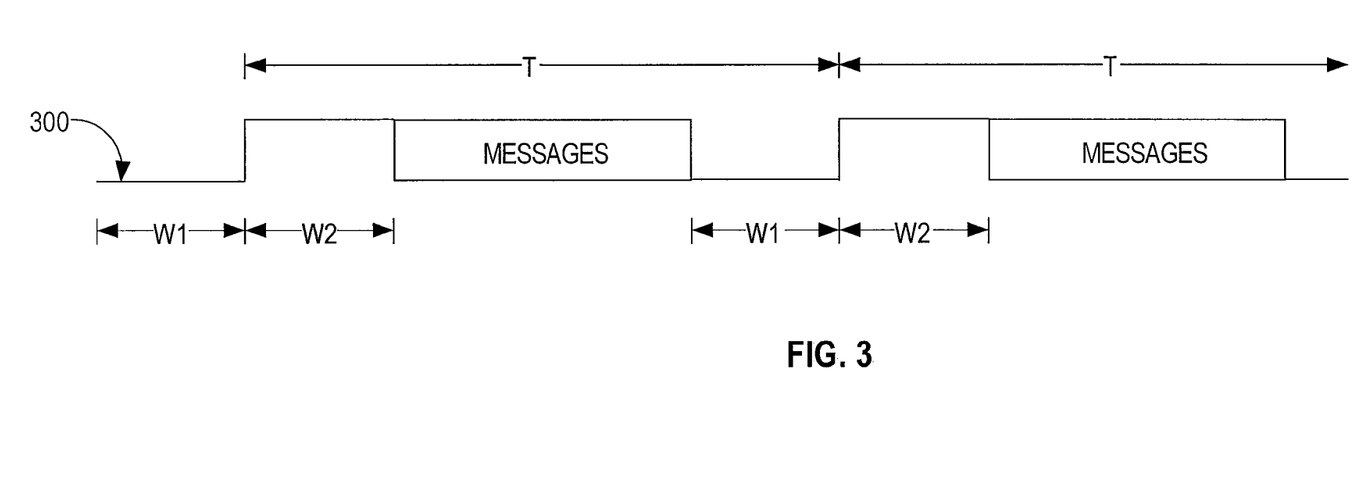
FIG. 3 is a diagram that illustrates an example of a timing signal, according to an embodiment of the invention.

FIG. 3 is a diagram that illustrates an example of a timing signal, according to an embodiment of the invention. In one embodiment of the invention, timing signal 300 includes portions that are at high voltages, and portions that are at low voltages. Each transition from a low voltage to a high voltage is called a "rising edge," and each transition from a high voltage to a low voltage is called a "falling edge." Through a combination of rising and falling edges at different time intervals, information can be expressed.

In one embodiment of the invention, whenever a radio detects that a period of at least a certain amount of time W1 has passed with the timing signal continuously at the low voltage, immediately followed by at least a certain amount of time W2 with the timing signal continuously at the high voltage, then the radio determines that another complete timing interval has started. In one embodiment of the invention, this complete timing interval comprises both the transmission timing interval and the receiving timing interval. For example, the transmission timing interval may comprise the first specified "X" milliseconds of the complete timing interval, and the receiving timing interval may comprise the remainder of the complete time interval (or the period of time that occurs between the end of the transmission timing interval and the beginning of the next complete timing interval). In FIG. 3, the duration of a complete timing interval (comprising both a transmission and receiving timing interval) is shown as length of time T.

In one embodiment of the invention, the timing signal is a "profile" (i.e., a certain combination of rising and falling edges occurring at certain time intervals relative to each other) and, in order to synchronize with an incoming timing signal, a TDD microwave radio that receives the incoming timing signal transmits and receives at timing intervals that are determined directly based on that "profile." Thus, in one embodiment of the invention, a TDD microwave radio does not even need to set any sort of internal clock in order to synchronize with the timing signal—a TDD microwave radio may merely read the incoming timing signal, act in accordance with the information contained therein, and propagate the same timing signal forward to the next connected radio.

In one embodiment of the invention, a TDD microwave radio reads message information that is contained in the timing signal immediately after each W2 interval. The message information may be conveyed via a series of rising and falling edges in the timing signal; for example, each specified period of high voltage in the message may indicate an "on" bit, while each specified period of low voltage in the message may indicate an "off" bit. The combination of bits conveys information to the radio that receives the timing signal. In order to ensure that no part of the message can be confused with the beginning of another complete timing interval, in one embodiment of the invention, the message is not permitted to contain a continuous period of low voltage that is at least as long as W1 immediately followed by a continuous period of high voltage that is at least as long as W2. Any other combination of periods of low and high voltage in the message may be acceptable.

Message information may comprise virtually any kind of information. Examples of information that may be conveyed in the message include radio status information, alarms, and commands. For a more specific example, an "upstream" TDD microwave radio may inform a "downstream" TDD radio, via a message, that the "upstream" TDD microwave radio, currently acting as the "source," is about to shut down. In response to receiving such a message, the "downstream" radio may assume the role of "source." Conversely, in response to receiving a message that indicates that the "upstream" radio has come back online, the "downstream" radio may relinquish its role as "source." Thus, the role that a given TDD microwave radio is supposed to play may be determined based on messages that the radio receives.

Thus, in one embodiment of the invention, a TDD microwave radio extracts message information (if any) from a timing signal before propagating that signal onward to the next connected radio. In the timing signal that the TDD microwave radio will propagate onward, the TDD microwave radio may replace the message information with null information (e.g., a continuous period of low voltage), or with a new message of the TDD microwave radio's own creation. Although a timing signal may optionally contain radio-generated message information in one embodiment of the invention, a timing signal does not need to contain any information beyond what is necessary for each TDD microwave radio to determine when a new complete timing interval has started.

Example Bypass-Containing TDD Microwave Radio

In one embodiment of the invention, each of the TDD microwave radios shown in FIG. 1 contains a "bypass" that automatically activates when (a) power to the TDD microwave radio is lost or (b) some other failure, which otherwise would prevent the TDD microwave radio from propagating an incoming timing signal to other TDD microwave radios, occurs in the TDD microwave radio. According to one embodiment of the invention, while the bypass of a particular TDD microwave radio is activated, all timing signals that are incoming on the particular radio's "synchronization in" port flow directly to the particular radio's "synchronization out" port and on to the next TDD microwave radio that is connected to the particular radio. For example, if TDD microwave radio 102B were to lose power, then the bypass of TDD microwave radio 102B would activate automatically in response to the power loss. While the bypass of TDD microwave radio 102B was activated, all incoming timing signals arriving at TDD microwave radio 102B from TDD microwave radio 102A would flow directly onward to TDD microwave radio 102C. Thus, the loss of power to TDD microwave radio 102B would not break the timing signal propagation chain.

Figure 4:
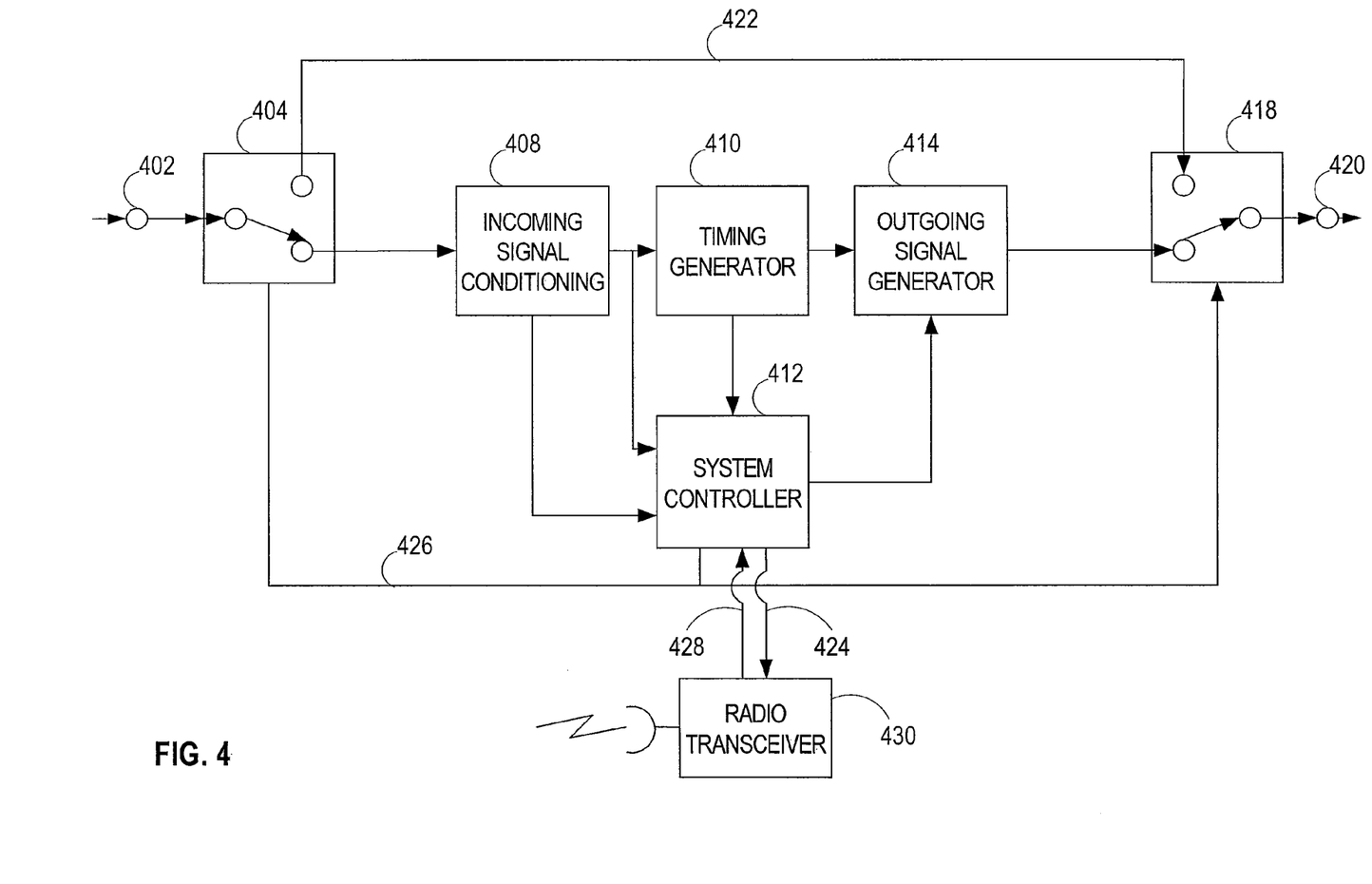
FIG. 4 is a block diagram that illustrates an example of the internal structure of a TDD microwave radio that contains an automatically activating bypass mechanism.

FIG. 4 is a block diagram that illustrates an example of the internal structure of a TDD microwave radio that contains an automatically activating bypass mechanism. In one embodiment of the invention, each of the TDD microwave radios shown in FIG. 1 is a radio that incorporates the internal structures illustrated in FIG. 4. Typically, each of the TDD microwave radios will have its own electrical power supply.

In most cases, the TDD microwave radio receives an incoming timing signal through the radio's "synchronization in" port 402. In many cases, the incoming timing signal will come over a cable from another connected TDD microwave radio that contains the same internal structure as is shown in FIG. 4.

From port 402, the timing signal flows into a relay 404. In one embodiment of the invention, relay 404 contains an electromagnet that is powered by the same electrical power source that powers the whole radio. While the power source is "on," the electromagnet holds a switch inside relay 404 into the position that is shown in FIG. 4. While the switch is in this position, the timing signal flows from relay 404 on to an incoming signal conditioning module 408. However, relay 404 also contains a spring or similar mechanical mechanism that produces an opposing but weaker force to that of the electromagnet. But for the presence of the force exerted on the switch by the electromagnet, the spring will move the switch into an alternative position within relay 404. While the switch is in this alternative position, the timing signal will flow from relay 404 into bypass 422 instead of incoming signal conditioning module 408. Thus, when the radio loses power, the electromagnet ceases to hold the switch in the original position illustrated, and the spring (no longer opposed by the stronger electromagnet) automatically moves the switch into the alternative bypass position. Thus, in one embodiment of the invention, the "bypass" mechanism is activated immediately and automatically by mechanical means (which require no electrical power) in response to the radio's loss of power. As will be discussed below, in certain embodiments of the invention, the bypass mechanism may be activated in response to other events also.

If the bypass mechanism is activated, then the timing signal flows from relay 404 through bypass 422 and into a relay 418. Relay 418 is similar to relay 404 in that the presence of electrical power will cause the switch to be held in the position illustrated in FIG. 4 by an electromagnet inside of relay 418. Similarly, the loss of electrical power to relay 418 allows a spring or similar mechanism inside of relay 418 to move the switch inside relay 418 into an alternative position in which the switch connects to bypass 422. While the switch of relay 418 is in this bypass state, the timing signal flows from bypass 422 through relay 418 and out of the radio through "synchronization out" port 420. In most cases, "synchronization out" port is connected via a cable to another TDD microwave radio that contains the same internal structure as that shown in FIG. 4. Under such circumstances, the timing signal is automatically propagated to that other radio despite any loss of power to the particular radio device through which the timing signal has passed.

In one embodiment of the invention, the switches in relays 404 and 418 do not automatically switch back into the positions shown in FIG. 4 upon the restoration of electrical power to those relays (although, in certain embodiments of the invention, relays 404 and 418 may do just that). Instead, in one embodiment of the invention, the switches in relays 404 and 418 remain in the bypass state until those relays receive an express command over a path 426 from a system controller 412, which will be discussed further below. In response to receiving such a command in such an embodiment of the invention, relays 404 and 418 reset to their original illustrated positions, thereby allowing incoming timing signals to flow into incoming signal conditioning module 408 once again.

Incoming signal conditioning module 408 comprises circuitry that extracts a message out of the timing signal if such a message is present within the timing signal. Module 408 sends any messages so extracted to system controller 412. Module 408 forwards the timing signal, from which messages have been extracted if such messages were present, on to timing generator 410.

Timing generator 410 receives the timing signal and, in one embodiment of the invention, synchronizes clocking information that the TDD radio device uses to determine when transmission and receiving timing intervals begin and end. For example, timing generator may set a timing reference (which may be within timing generator 410) in synchrony with the incoming timing signal. If the incoming timing signal is later lost for some reason, then this timing reference may continue to generate a timing signal based on the last available synchronization, for at least a specified amount of time. Additionally, if the TDD radio device is in "source" mode, or if the TDD radio device has started acting as a source while in "auto" mode, then the timing reference also may be used to generate an original timing signal.

Timing generator 410 forwards the timing signal on to system controller 412. System controller 412 is a microprocessor in one embodiment of the invention. System controller uses the timing signal to instruct transmitting and receiving mechanisms with the TDD microwave radio to transmit data over the air exclusively during transmission timing intervals, and to receive data over the air exclusively during receiving timing intervals. System controller 412 also may receive commands from a user (e.g., over the Internet via a web server-presented user interface) and change the mode (e.g., "source," "auto," or "recipient") of the TDD microwave radio in response. System controller 412 additionally may receive, from incoming signal conditioning module 408, messages that module 408 extracted from a message-bearing incoming timing signal. System controller 412 may alter the behavior and/or mode of the TDD microwave radio in response to these messages. System controller 412 may, under certain circumstances, send commands to relays 404 and 418 over path 426. Such commands may expressly instruct relays 404 and 418 to either enter or exit bypass mode. For example, system controller 412 may determine that some fault has occurred within the TDD microwave radio. In response, system controller may command relays 408 and 418, via path 426, to change switch positions so that the TDD microwave radio enters bypass mode.

System controller 412 controls a radio transceiver 430 via path 424. Radio transceiver 430 sends and receives data over-the-air, respectively, at transmission timing intervals and receiving timing intervals, respectively, that are dictated by system controller 412. System controller 412 determines when each of these timing intervals is to begin and end based on timing signals from timing generator 410. Radio transceiver 430 may also receive data over-the-air from other sources, and may pass that data on to system controller 412 via path 428. As is discussed above, such data from other sources may include an inverted timing signal from a remote TDD microwave radio in a different "cluster."

In addition to sending the timing signal to system controller 412, timing generator 410 also sends the timing signal on to outgoing signal generator 414. Outgoing signal generator 414 receives this timing signal. Outgoing signal generator 414 may, additionally, receive message data that system controller 412 generated. In one embodiment of the invention, outgoing signal generator 414 contains circuitry that inserts such message data into the timing signal under circumstances where such message data has been received from system controller 412. After merging the message data into the timing signal if necessary, outgoing signal generator 414 forwards the timing signal on relay 418. The functionality of relay 418 is discussed in considerable detail above. If the TDD microwave radio is not currently in the "bypass" state, then the timing signal flows from outgoing signal generator 414 through relay 418 and out through "synchronization out" port 420.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, at a particular radio device, from an upstream device that is separate from the particular radio device, a first signal that indicates timing information;
   based on the timing information that is indicated in the first signal, synchronizing, at the particular radio device, a timing reference that the particular radio device uses to determine when to transmit over the air;
   sending, from the particular radio device to a downstream radio device that is separate from both the upstream device and the particular radio device, a second signal that indicates the timing information;
   based on the timing reference that has been synchronized based on the timing information, transmitting over the air from the particular radio device concurrently with the downstream radio device transmitting over the air.

2. The method of claim 1, wherein:
   the particular radio device receives the first signal over a first direct cable connection between the upstream device and the particular radio device;
   the particular radio device sends the second signal over a second direct cable connection between the particular radio device and the downstream radio device;
   the first direct cable connection is separate from the second direct cable connection; and
   the upstream device is not directly connected to the downstream radio device by either the first or second direct cable connections.

3. The method of claim 1, wherein the downstream radio device synchronizes, based on the timing information that is indicated in the second signal, a particular timing reference that the downstream radio device uses to determine when to transmit over the air.

4. The method of claim 1, wherein the downstream radio device receives the second signal over the air from the particular radio device, and wherein the downstream radio synchronizes the particular timing reference in a manner that is inverted from information contained in the second signal.

5. The method of claim 1, further comprising:
   setting the particular radio device to operate in a "source" mode;

wherein, as a consequence of the particular radio device being set to operate in the "source" mode, the particular radio device generates and propagates, to at least one other radio device, a timing signal that is generated by the particular radio device and that is not based on any signal that is generated by any other device with which the particular radio device is connected.

6. The method of claim 1, further comprising:
setting the particular radio device to operate in an "auto" mode;
wherein, as a consequence of the particular radio device being set to operate in the "auto" mode, the particular radio device can propagate an incoming timing signal to another radio device for as long as the particular radio device detects the incoming timing signal;
wherein, as another consequence of the particular radio device being set to operate in the "auto" mode, the particular radio device can begin to propagate, to another radio device, a timing signal of the particular radio device's own generation in response to circumstances that include the particular radio device detecting no incoming timing signal for at least a specified amount of time.

7. The method of claim 1, further comprising:
setting the particular radio device to operate in a "recipient" mode;
wherein, as a consequence of the particular radio device being set to operate in the "recipient" mode, the particular radio device can propagate an incoming timing signal to another radio device for as long as the particular radio device detects the incoming timing signal, but the particular radio device stops transmitting over the air in response to circumstances that include the particular radio device detecting no incoming timing signal for at least a specified amount of time.

8. The method of claim 1, wherein:
the upstream radio device, the particular radio device, and the downstream radio device(s) are included in a loop of connected radio devices;
any one of the radios in the loop can be selected as a source radio;
the source radio device in the loop generates a timing signal based upon which other radio devices in the loop synchronize transmitting and receiving time intervals; and
the source radio device does not utilize incoming timing signals from other radio devices in the loop.

9. The method of claim 1, further comprising:
extracting, from the first timing signal, at the particular radio device, first message data that a radio device other than the particular radio device inserted into the first timing signal; and/or
inserting the second message into the second timing signal at the particular radio device prior to sending the second signal to the downstream radio device.

10. The method of claim 1, further comprising:
determining, at the particular radio device, that no incoming timing signal is detectable at the particular radio device;
determining that the particular radio device is currently set to operate in an "auto" mode;
in response to determining (a) that no incoming timing signal is detectable at the particular radio device and (b) that the particular radio device is currently set to operate in an "auto" mode, transmitting over the air at the particular radio device, for a specified amount of time, during time intervals that are determined based on the timing reference, which was previously set based on an incoming timing signal during a time when an incoming timing signal was detectable at the particular radio device;
determining, at the particular radio device, that an incoming timing signal has been re-detected after a period of time that no incoming timing signal was detected at the particular radio device; and
in response to determining that an incoming timing signal has been re-detected, re-synchronizing the timing reference based on information contained in the incoming timing signal.

11. The method of claim 1, further comprising:
receiving, at the particular radio device, from the upstream device, information that indicates that the upstream device, which was generating the first signal, is going to stop generating the timing signal; and
in response to receiving the information that indicates that the upstream device is going to stop generating the timing signal, the particular radio device entering a state in which the particular radio device generates a timing signal independently.

12. The method of claim 1, further comprising:
in response to events including but not limited to (a) losing electrical power, (b) alarm conditions, or (c) configuration changes at the particular radio device, the particular radio device automatically entering a state in which incoming timing signals bypass one or more components of the particular radio device and flow through to the downstream radio device.

13. The method of claim 1, wherein the particular radio device comprises one or more relays that, upon events including but not limited to (a) losing electrical power, (b) alarm conditions, or (c) configuration changes, automatically switch into a configuration that routes incoming timing signals around one or more components of the particular radio device that operate off of the electrical power only while the electrical power is supplied to those components.

14. The method of claim 1, wherein the upstream device is a radio device, wherein the upstream device uses the timing information to determine when to transmit over the air and when to receive over the air, and further comprising:
based on the timing reference that has been synchronized based on the timing information, transmitting over the air from the particular radio device concurrently with the upstream device transmitting over the air; and
based on the timing reference that has been synchronized based on the timing information, ceasing from transmitting over the air from the particular radio device during all times in which the upstream device is receiving any data over the air.

15. A particular TDD microwave radio that is configured to:
receive, from an upstream device, a first signal that indicates timing information;
synchronize, based on the timing information that is indicated in the first signal, a timing reference that the particular TDD microwave radio uses to determine when to transmit over the air;
send, to a downstream TDD microwave radio, a second signal that indicates the timing information;
transmits over the air concurrently with the downstream TDD radio transmitting; and
cease from transmitting over the air for a period of time during which the downstream TDD microwave radio receives over the air;
wherein the particular TDD microwave radio determines (a) the time intervals during which the particular microwave TDD radio transmits over the air and (b) the time intervals during which the particular microwave TDD radio ceases from transmitting over the air based at least in part of the timing information that is indicated in the first signal.

16. The particular TDD microwave radio of claim 15, further comprising:
a bypass mechanism that automatically forwards a timing signal, which comes to the particular TDD microwave radio from the upstream device, through the particular TDD microwave radio and on toward the downstream microwave radio in case of events including but not limited to (a) losing electrical power, (b) alarm conditions, or (c) configuration changes at the particular TDD microwave radio.

\* \* \* \* \*